United States Patent [19]

Seiler

[11] 4,344,975
[45] Aug. 17, 1982

[54] PROCESS FOR THE PRODUCTION OF AGGLOMERATED BREAD CRUMBS

[75] Inventor: Werner Seiler, Züberwangen, Switzerland

[73] Assignee: Gebruder Buhler AG, Uzwil, Switzerland

[21] Appl. No.: 128,155

[22] Filed: Mar. 7, 1980

[30] Foreign Application Priority Data

Mar. 15, 1979 [CH] Switzerland .......................... 2505/79
May 16, 1979 [DE] Fed. Rep. of Germany ....... 2919845

[51] Int. Cl.³ .............................................. A21D 2/00
[52] U.S. Cl. .................................... 426/285; 426/554; 426/555; 426/453; 99/324
[58] Field of Search ................ 426/96, 618, 622, 453, 426/455, 456, 285, 476, 511, 508, 510, 523, 554, 555

[56] References Cited

U.S. PATENT DOCUMENTS 277,792  9/1822  Scheitzer ............................. 426/622
3,133,818  5/1964  Gould et al. ......................... 426/464
3,360,865  1/1968  Galle et al. .......................... 426/285
3,445,239  5/1969  Viault, Jr. ............................ 426/458

FOREIGN PATENT DOCUMENTS 2339344  8/1977  France ................................. 426/455

OTHER PUBLICATIONS

Kissinger, *Food Engineering*, Jun. 1969, pp. 76–77.

*Primary Examiner*—Thomas G. Wiseman
*Assistant Examiner*—Elizabeth A. Hatcher
*Attorney, Agent, or Firm*—Oblon, Fisher, Spivak, McClelland & Maier

[57] ABSTRACT

The invention relates to a process for the production of bread crumbs from a starch-containing raw material characterized by the raw material being humidified to a water content of 20 to 50% by weight while forming agglomerates, the agglomerates being baked under the influence of humid heat and subsequently dried. Bread crumbs of a desired agglomerate size are obtained from the dried product, if necessary, after granulation.

19 Claims, 17 Drawing Figures

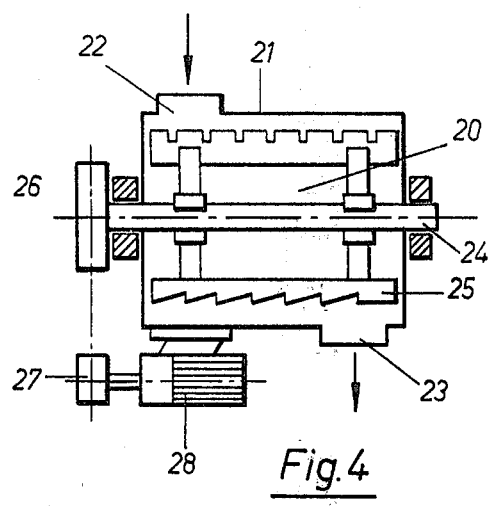
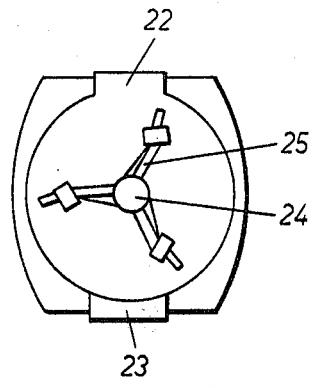
Fig.4  Fig.5
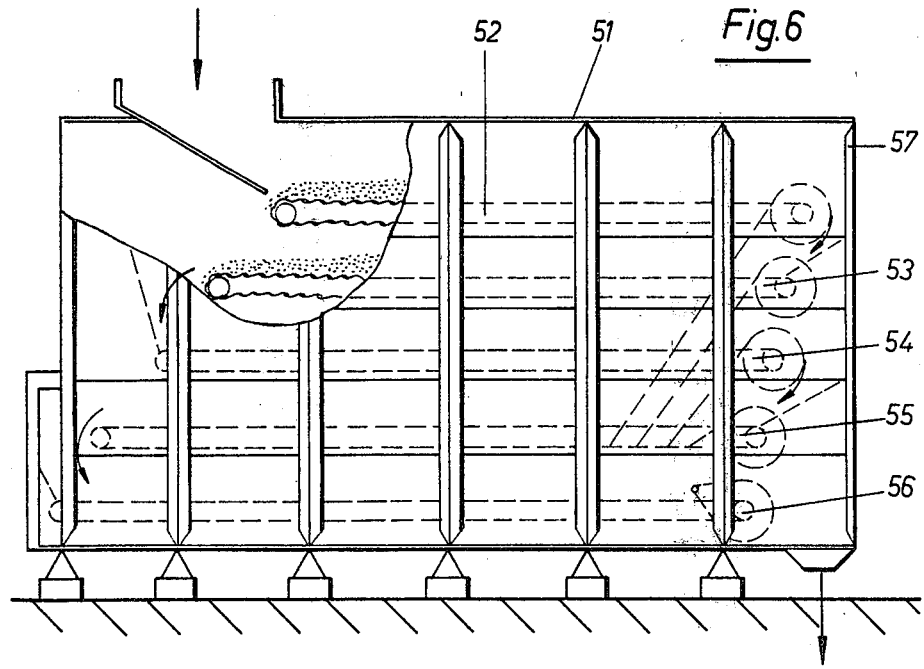
Fig.6

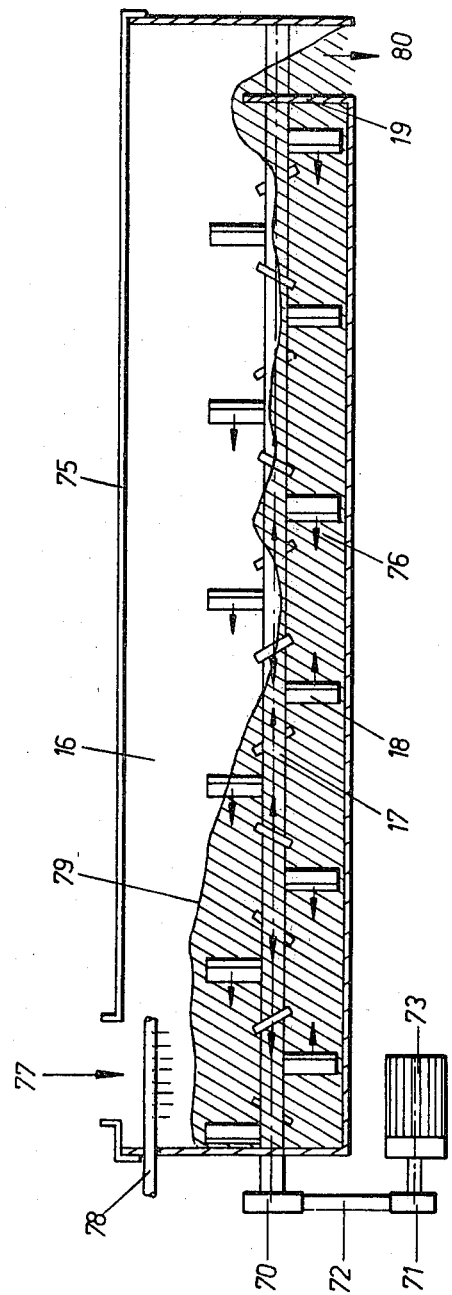
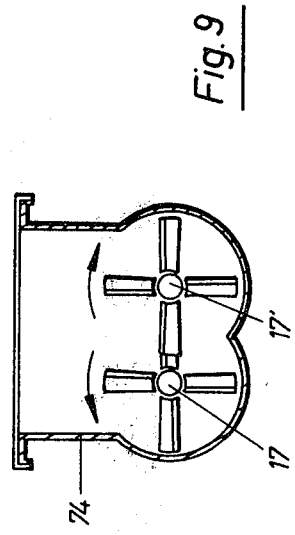
Fig. 8
Fig. 9

PROCESS FOR THE PRODUCTION OF AGGLOMERATED BREAD CRUMBS

BACKGROUND OF THE INVENTION

The invention concerns a process for the production of bread crumbs from a starch-containing raw material in the form of flour, grits, semolina or meal, an arrangement for the performance of such a process as well as bread crumbs which are subsequently obtained and the use of these bread crumbs as an instant product.

Bread crumbs are a more or less granulated flour. The purpose of their use is that they are favorable to the frying process by catching, for example, the fat discharging from the meat while frying and the meat juice. Therefore, they must have a good adherence and absorption capacity without covering up the taste of the product covered with the bread crumbs. The color of the bread crumbs is light or dark depending on the kind of the production process and on the kind of raw materials used. The bread crumbs used in households are mostly darker. The reason lies in the fact that preferably bread sections are used for its production in households. Very often, the housewife processes also strongly baked bread into bread crumbs. In both cases, the portion of the bread crust is larger and gives a dark color to the bread crumbs. The portion of bread crumbs obtained from the bread crust has a lower absorption capacity and tends to carbonize during the frying process. The components of the crust which have formed during the baking process owing to chemical reactions, such as dextrin (at 110° to 140° C.), caramel-type substances (at 140° to 150° C.) and roasting products (at 150° to 200° C.) as well as carbonized portions, are not desired in the bread crumbs. Therefore, too large a portion of bread crust gives an undesirable characteristic taste to the bread crumbs.

The above mentioned points of view are taken into account in the industrial production of bread crumbs. Thus, very light bread crumbs are often offered for sale for psychological reasons. Attention is paid to the loaves of bread which are especially baked for the production of bread crumbs to the effect that little dark crust develops so that the taste of the bread crumbs is a neutral one and has only very lightly the taste of customary bread. This taste of bread should, by no means, come through.

According to an earlier definition, bread flour is an unimportant kitchen item to which the word "flour" was attached because it originates from a crushing process following the baking process. It should actually be called bread crumbs. According to a more than one hundred year old definition, "breading" means "to sprinkle grated bread on pieces of meat" (cf. Brockhaus, Issue 1861). The use of a cake-like baking dough is not mentioned. According to a definition in the Duden, baking means "to prepare with a dough and to cook it and make it edible under the effect of heat". In any case, roasting effects are not desired in the production of bread crumbs.

Today, the above mentioned definitions are only applicable to a limited extent when considering present consumption customs and tendencies. Therefore, "bread crumbs" are also frequently used neutral stuffings, for example, a meat, almond and nut stuffings. They are also used in order to prepare gravies, snacks, etc. Specially spiced bread crumbs for prepared meals are demanded more and more.

The two, so far customary, industrial processes for the production of bread crumbs are similar to each other. In the case of an older process, baked goods, rolls, bread, etc. which could not be sold are dried and ground to the desired size. This process is actually an economical one since the baked goods are completely utilized as food. However, more recently this has been more and more questioned. The doubts have primarily developed on the basis of the problems of hygiene. Since the distribution organizations have distribution networks covering large areas, a regular recollection of the merchandise that was not sold is very expensive. It also involves strict hygienic requirements and, furthermore, strict requirements as to preservation. The normally baked bread has actually a comparatively high humidity so that it becomes moldy after a short storage period in an unsuitable packing. The infection of baked goods with mold fungi is partially effected through the air (indirect infection) and partially through contact with dirty surfaces on machines, devices, etc. (direct infection). Moldy baked goods are considered as being spoiled in the sense of the law on food items. They are not only impaired as to the way they look, their odor and their taste but there is also the danger of impurities consisting of toxic metabolic products of the mold fungi.

For the above given reasons, this process is only applicable, therefore, within a bakery, restaurant or another operation because a sufficient control is only ensured within the same operation.

In the case of a more recent process, special loaves of bread are produced to obtain bread crumbs. This process has been adopted on an industrial scale especially because it does not only produce less expensive forms of bread but the bread quality could also be adapted to the requirements of bread crumbs.

Very recently, a number of new processes have become known which differ considerably from the classic methods which is, for example, described in the Swiss Pat. No. 335 934. In the German Pat. No. 100 624, a process is, for example, described for the continuous production of flour for rolls where wheat flour is stirred into a viscous dough with water and salt. The dough is subsequently baked in strips of 1 to 2 cm on a heated steel band, dried, the surface is browned and it is ground. The bread crumbs are then finally obtained from the ground product.

According to another recently developed process, it is attempted to apply a high heat and pressure during the baking process by using extruders. It is not known that satisfactory results are obtained with such a process. The plant investment as well as the energy consumption are not lower in the case of the two last described processes than in the case of the traditionally selected process using the actual bread.

SUMMARY OF THE INVENTION

The invention is based on the task to further develop the process described in the introduction in such a way that it can be carried out continuously and more economically. Additionally, the invention shall propose a particularly suitable arrangement for the performance of such a process, a new improved type of bread crumbs as well as particularly suitable possibilities for the use of these bread crumbs.

According to the invention, this task is accomplished by means of a process of the kind described in the introduction in that the raw material is humidified to a water content of about 20 to 50% by weight under the formation of agglomerate, the agglomerates are baked under the influence of humid heat and are, subsequently, dried and the bread crumbs of a desired size of agglomerates is obtained from the dried product, if necessary, after a granulation.

The arrangement according to the invention is characterized by the fact that it has a device for the humidifying of the raw material, a baking device—if necessary, a separator—and a drier.

The bread crumbs which can be obtained in accordance with the process of the invention are characterized additionally by an almost 100% starch hydrolyzation as well as a high gelatinization. A further feature can be seen in the fact that they consist of flour, grits, seminola or meal in a gelatinized form whereby agglutinants connect the particles of these raw materials to form agglomerates.

BRIEF DESCRIPTION OF THE DRAWINGS

FIG. 4: a longitudinal section through a separator;

FIG. 5: a cross-section of FIG. 4;

FIG. 6: a continuous belt drier;

FIGS. 8 and 9: a pallet mixer shown in longitudinal or cross-section, respectively;

DESCRIPTION OF THE INVENTION

Figure 1:
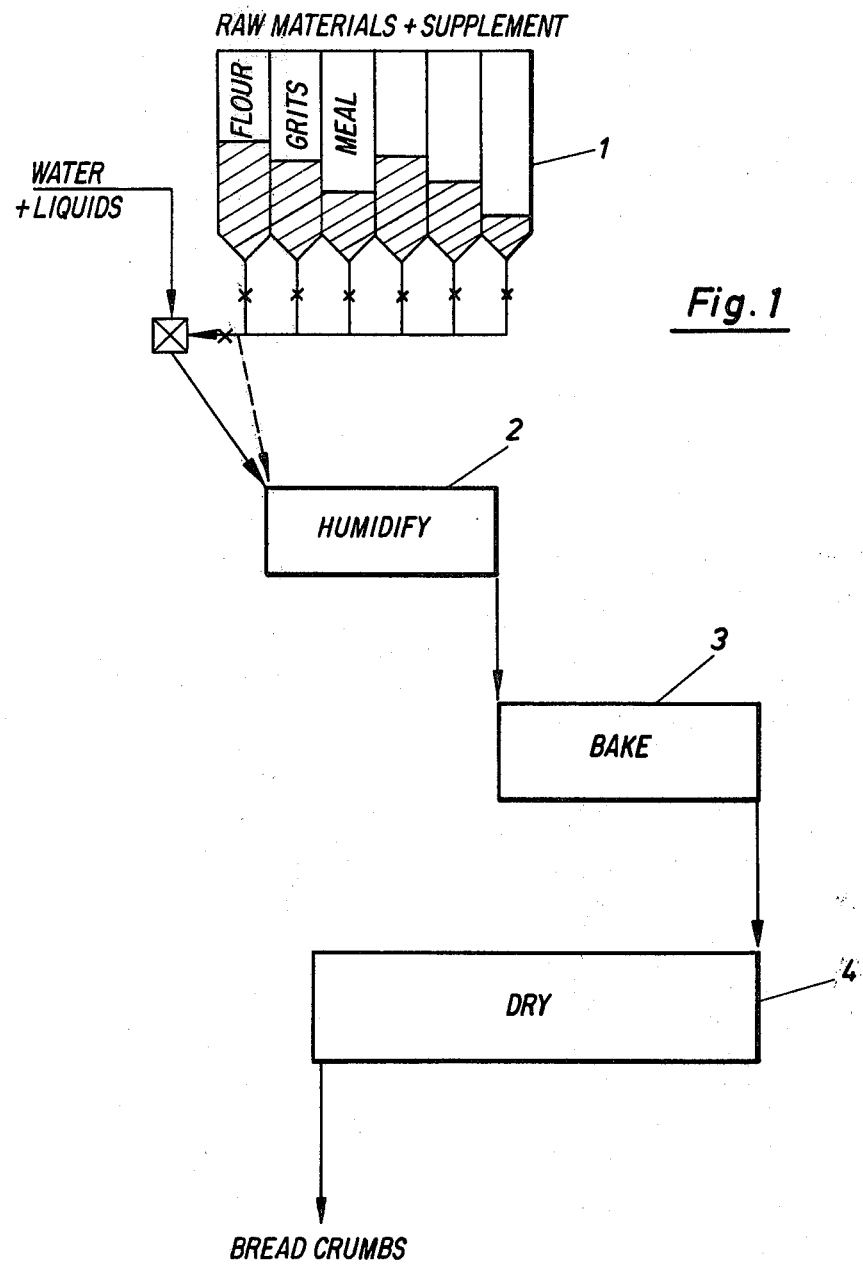
FIG. 1: a simplified schematic representation of the process according to the invention.

When we talk about bread flour within the framework of the invention, then this term is to be understood in its largest sense. This means that it is not just a question of a "flour" which is used, for example, to bread meat for frying but it also serves as a neutral stuffing material for meat, almond and nut stuffings as well as for the production of gravies and snacks, etc. By the same token, it is to be used, particularly in spiced form, in prepared meals. Therefore, it basically represents a very important kitchen item in the form of a more or less fluid product in the form of particles the use of which is not restricted to the above mentioned possibilities. Thus, it is left to the capabilities of any good housewife who is attempting to produce good and individual cooking to now prepare all kinds of meals using also such bread crumbs.

The kind of starch-containing raw material is not subject to any essential restrictions. It must just be available in the form of flour, grits, semolina or meal in order to be processed according to the invention. Especially cereal grains of plants are suitable for the purposes of the invention which have been grown for a long time as human food owing to their dry grains or seeds which are rich in starch. These can be, for example, wheat, rye, barley, oats, rice, millet and Indian corn. The different types of flour made from these products can vary very much whereby the type of flour is the ash content of the dry flour substance multiplied by the factor 1000. Thus, the following products can, for example, be used: wheat flours of the Type 405 (so-called extracted flour), 550 (flour for rolls), 812 and 1050 (flour for mixed bread), 1700 (baking meal) and rye flours of the Type 997 (light flour for bread) 1150 (flour for mixed bread, flour for grey bread), 1370 (flour for dark bread) and 1800 (baking meal). It goes without saying that the raw material sources for the process of the invention are not restricted to the above mentioned cereal plants. Also any other plants with starch-containing grains are to be taken into consideration which must, however, as cereal grains and such, either contain sufficient protein (agglutinant) or the necessary protein must be added to them in sufficient quantities. The importance of the protein portion in the initial material for the process according to the invention is still further explained below.

According to the invention, the starch-containing raw material in the form of flour, grits, seminola and/or meal is humidified in a suitable device to agglomerates with a water content of about 20 to 50% by weight, as a rule during a period from 2 to 20 minutes. A water content of 30 to 40% by weight is particularly preferred. The partial agglomerates obtained by the agglomeration should, preferably, have a diameter of less than 20 mm in order to be subsequently baked under the influence of humid heat. The particularly preferred range of the size of the particles of the agglomerates is between 0.2 and 8 mm. The best results are obtained when the starch-containing raw material is humidified in a continuous pallet mixer to form loose dough agglomerates and the agglomerations forming in this way are crushed or separated into individual agglomerates of, for example, less than 6 mm by means of a mechanical cutting effect in order to be subsequently baked. It is made sure in this way that lumps of dough are transformed into smaller agglomerates having the mentioned diameter range.

It is of advantage if the humidifying, formation of agglomerates, the possibly performed separation into smaller agglomerates and the subsequent baking are effected in a continuous operation which leads to best results. The process according to the invention differs from the pure bread production particularly by the fact that there must not be an extensive fermenting process. No addition of yeast is, for example, required. This leads to a shorter period for the process. Additionally, the process according to the invention requires less drying energy in comparison with the process for the production of bread owing to the by 50% lower requirement of water. The direct baking of the agglomerates with hot steam is of particular advantage whereby the baking is preferably effected with wet steam, i.e. supersaturated steam. In this case, it is especially preferred that the wet steam contains at least as much humidity that the humidity exchange between the raw material and the wet steam is in a balance. Particularly favorable results are obtained when the wet steam contains so much humidity that the humidity of the raw material is increased by 1 to 10% by weight.

The steam selected for the baking, using the process according to the invention, has preferably an initial temperature of 90° to 200° C. whereby the range from 90° to 130° C. is particularly preferred. The product temperature during baking is prefereably between 60° and 100° C. whereby the range from 80° to 95° C. is considered to be particularly preferable. Therefore, the most favorable results are obtained when the product temperature is exactly maintained within the range which prevails inside the bread during the customary baking process. However, the large time factor is eliminated which is to be taken into consideration for the baking of loaves of bread, i.e. until the heat has also penetrated into the inside of the bread and thus the bread is thoroughly baked.

The degree of gelatinization plays a special role for the products to be obtained with the process of the invention. For most types of bread crumbs, a gelatinization degree of 50 to 100%, often little below 100%, is desired; the degree of gelatinization which is particularly favorable in the respective case depends also on the question of the use of the bread crumbs according to the intention.

The desired degree of gelatinization can be adjusted in an especially convenient manner by baking the agglomerated starch-containing raw material preferably for 1 to 20 minutes, whereby the range from 2 to 10 minutes is particularly preferred, as a charged layer in the baking chamber, preferably on a sieve-like conveyer belt, and/or in a round baking chamber with a conveying, whirling pallet mixing shaft. The baking period can be adjusted to the respective special requirements of the processed product, particularly also with a view towards optimum humidity and temperature conditions. The most favorable baking time was between 2 and 6 minutes for the regular bread crumbs used in the kitchen whereby, in most cases, a baking period of 4 minutes was sufficient. Longer baking periods lead to an increased gelatinization which can be of advantage in some cases. However, the bread crumbs have, in general, a better structure after shorter baking periods.

After the baking, the obtained gelatinized material shall be made to have a particle diameter of a few mm, i.e. preferably less than 20 mm, if necessary, by means of a mechanical treatment, whereby a particle diameter of less than 10 mm is particularly preferred. In this way, it can be prevented that the sintering with the agglutinant is stopped beyond the grain size of the agglomerates desired in the bread crumbs. In the case of this separation, it is not a question of a customary grinding but actually of a dividing or cutting of the agglomerates. For this reason, a very small portion of undesired fine particles of a few percent only is obtained in a natural way and this portion can be used again as a raw product. This separation can be effected through mechanical cutting, for example, in the following devices:

Separator rotor with toothed longitudinal strips, cutter reel or rotor with cutting effect as well as a separator with sieve-like walls.

It was, furthermore, determined through investigations that, when performing the process according to the invention, exactly the same thermal conditions required for the baking process in the form of the effect of humid heat are reproduced which prevail inside the bread during the traditional baking. It is always attempted to prevent too quick a formation of the crust under the effect of the steam in the baking oven during the first phase of the bread baking, i.e. during 5 to 10 minutes. According to the invention, the baking process now takes place with the use of humid heat which means nothings else than that the first phase is reproduced during the bread baking or similar conditions which prevail inside the bread during the baking process. The bread crumbs according to the invention shall be produced under the optimum thermal baking conditions without having to accept the disadvantages when baking entire loaves of bread, i.e. a high, particularly dry heat and long periods under such conditions, for example, of up to 1 hour, as well as high water contents of the goods to be baked before they are subjected to the baking process. In this connection, it is remarkable that the bread crumbs according to the invention have a better chemical structure than a product which is made of the inner core (i.e. approximately 1 to 4 cm below the crust of the bread). There are practically no dextrinated parts at all in the best bread crumb products according to the invention.

Subsequent to the baking or the above explained separating or dividing of the agglomerates, the drying is effected whereby the baking and the drying is preferably effected in two separate procedural steps for structural and processing-technical reasons. This is preferably done in a continuous operation.

The separation after the baking as well as the subsequent drying of the hot product to be treated are effected without interruption.

The crumbly dough substance can also be dried to less than 14% humidity content to become a lasting baked product by rearranging the layer several times during the drying process which is preferably effected at a temperature below 100° C.

Directly after the drying, a portion of the bread crumb fraction is obtained immediately by passing through a sieve while the portion discharged from the sieve is crushed to the size of agglomerates as desired, it is sorted out and, if necessary, the process is repeated. In this way, a final product which is very uniform and of good appearance is obtained if the discharged portion from the sieve is crushed by means of grooved rolls using a cutting effect to arrive at the desired size of agglomerates.

The process according to the invention can be subjected to multiple variations as regards the additional treatment of the processed materials. Thus, any suitable substances can, for example, be mixed into them or can be sprayed on them during each step of the process. Salt, pepper, paprika, sugar, flavor substances and other supplements are considered as particularly advantageous ingredients. In general, these are mixed into the raw materials before or after the humidification. Depending on the atmosphere prevailing during the baking and/or drying phase, also special, directly targeted, chemical reactions, such as the development of flavor, can be carried out as an integrated part of the bread crumb production.

The finished bread crumbs which are obtained in accordance with the invention and which leave the drier in a cooled condition and are, if necessary, still passed through a sieve or crushed, respectively, show a multitude of considerable advantages. Thus, they have a uniform, light-dull coloring without any deviation, for example, dark points. Test persons felt them as particularly pleasant in their mouths, especially also during the act of swallowing. The eye does practically not detect a difference from the known bread crumbs as to the shape of the grains. This difference appears on a photomicrograph. Thus, already a photomicrograph, enlarged 25 times, shows individual grains which are frequently round or partially round and only broken-off at some points which is due to the crushing. Partially, little air bubbles seem to be baked into the bread crumb granulates according to the invention. The shapes can actually be considered as smooth and give a highly glass-like impression because of the high gelatinization. When looking at the starch agglutination through the microscope, a starch hydrolysis is additionally determined up to about 100%. The criterion for the hydrolyzed starch is the disappearance of the double refraction of the light which can be recognized by the fact that intact starch grains with a cross light up strongly. Also the $\beta$-amylasis method (developed at the Kansas State University, Manhattan, U.S.A.) resulted in a very high degree of hydrolysis of the starch with 370 mg maltose/g of dry substance which was processed according to the regulation of Example 1.

Finally, all test persons unanimously confirmed that products treated or breaded with them, particularly meat, were improved as to their taste or feeling in the mouth in comparison with commercially available products. They prove to be an easily digestible food item of high value and become thus a significant aid in the kitchen.

When producing the bread crumbs according to the invention, a conditional retrogradation (recrystallization of the starch) occurs through the cooling process which can be easily controlled by regulating the production conditions which represents a special advantage of the process according to the invention in comparison with the process which proceeds from the bread.

Furthermore, the bread crumbs according to the invention have an excellent protein structure. This creates particularly favorable prerequisites for an advantageous application of the product according to the invention, for example, for the breading of meat or also as a stuffing, for example, for ground meat, nut stuffings and such. In this context, the regular or uniform structure of the bread crumbs according to the invention is of importance.

It was surprisingly demonstrated that the bread crumbs according to the invention can be used as an instant product (practically immediately ready for us, for example, in 1 to 2 minutes) for a meal, such as a thick semolina or corn gruel. For this purpose, the instant product is used in a highly gelatinized form whereby preferably agglomerates gelatinized to 80-100% are selected which can be converted into the desired granulation by grinding, sieving, etc. When used in the kitchen, one part of instant bread crumbs are mixed in a bowl with 3 to 5 parts of hot or warm water. Through light stirring, a thin or more viscous semolina gruel is obtained depending on the amount of water. After having added sugar, cream, etc. to taste, the semolina gruel can be eaten as a prepared meal.

However, the bread crumbs can be made into a thicker gruel by stirring 1 to 3 parts of water into it which will solidify after a short period of time in order to be baked or fried after.

The bread crumbs according to the invention, independent of their use, have always the advantage that they can be subjected to an additional thermal process, such as baking, frying and cooking, after their processing owing to the careful thermal treatment effected during their production in order to obtain a physiologically proper meal which is very satisfactory from the point of view of its taste.

Figure 13:
FIG. 13: electron scan photomicrographs (10 times enlarged) of the bread crumbs according to the invention.
Figure 14:
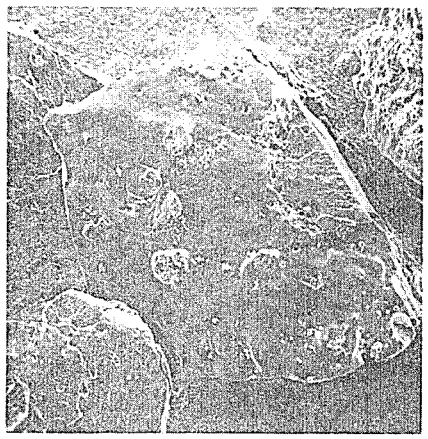
FIGS. 14 and 15: electron scan photomicrographs (50 times enlarged) of the bread crumbs according to the invention.
Figure 15:
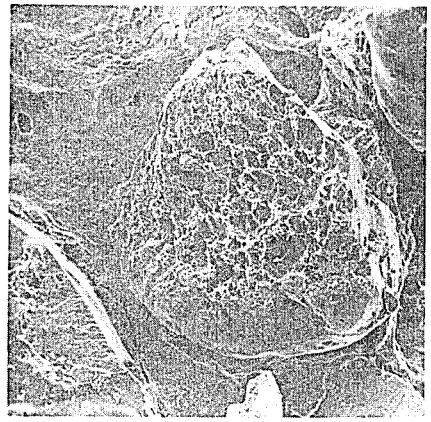
Figure 16:
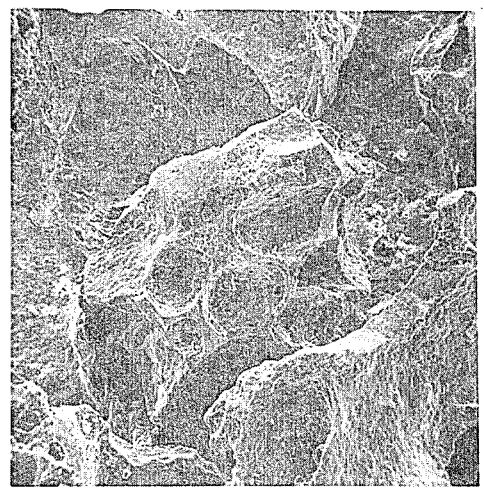
FIGS. 16 and 17: electron scan photomicrographs (50 times enlarged) of a commercially available or a household product, respectively.
Figure 17:
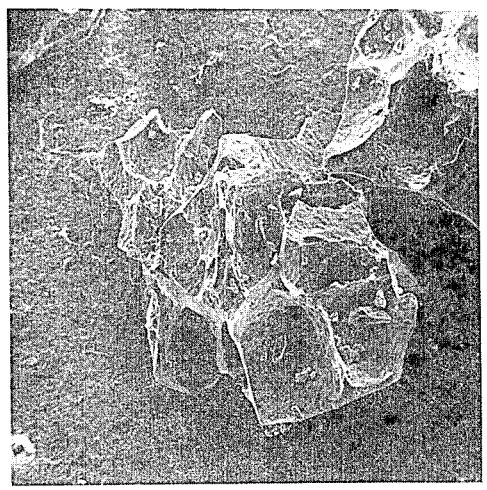

The appearance of the bread crumbs according to the invention differs very distinctly from that of known bread crumbs. This can easily be determined when comparing the electron scan photomicrographs of FIGS. 16 and 17 which show known bread crumbs and the photomicrographs of FIGS. 13-15 (invention). FIG. 17 shows bread crumbs which were made from dry bread leftovers using the traditional method of housewives whereby, however, a relatively high proportion of bread crusts was used. FIG. 16 shows a commercially available sample.

Indented and bizarre shapes can very clearly be recognized in FIGS. 16 and 17 which are due to a forcefully crushed bread structure. Furthermore, many hollow spaces, the smallest pores of the bread, but particularly many flat lamina-like particles are visible. The thicker parts are very milky while only the thinner ones have a glass-like appearance. Many dark parts and also inclusions are visible in particular in the bread crumbs for household use. 200 mg maltose/g of dry substance were determined in the commercially available bread crumbs according to FIG. 16.

The known bread crumbs, particularly those shown in FIG. 16, show a structure under a microscope which can actually be compared with a washed-out limestone. Numerous intact starch grains could be demonstrated under the microscope in the case of all examined samples of the known bread crumbs. The retrogradation improving the quality of the bread crumbs was largely missing in the customary bread crumbs produced from loaves of bread.

The essential steps of the process according to the invention are schematically shown in FIG. 1. The raw material is taken from the bin 1, put into a humidifying system 2, into a baking oven 3 and into a drier 4. After the drying, a portion of the finished bread crumbs can already be obtained.

Figure 2:
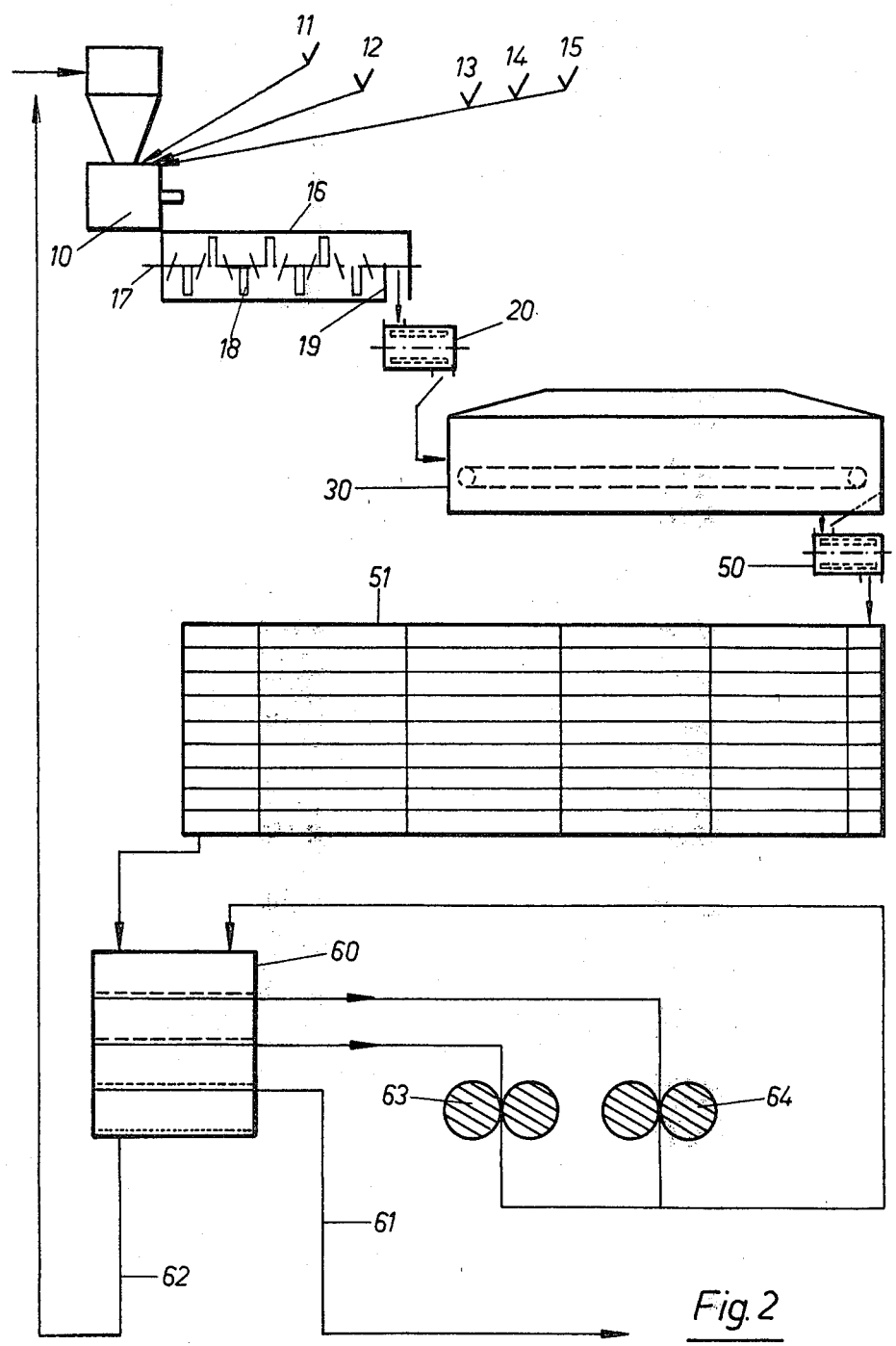
FIG. 2: a schematic representation of the arrangement according to the invention.

In FIG. 2, an arrangement according to the invention is shown in a somewhat more concrete and also schematic form. Different initial components are led into a dosing unit 10 by means of a conveyor which can be, for example, the raw material 11, water 12, other liquid components 13, customary supplement substances 14 and other substances 15. The dosing unit 10 supplies all substances, with the desired hourly capacity, into a pallet mixer 16 which has one or two mixing shafts 17 with a larger number of pallets 18. The pallet mixer 16 has a free discharge 19 at the end of the outlet side. The product falls out through the discharge 19 in an agglomerated condition whereby the size of the agglomerates varies from fractions of millimeters to agglomerate lumps of several centimeters. The agglomerates drop directly into a separator from the pallet mixer 16.

The separator 20 is shown in FIGS. 4 and 5 at a larger scale. In a round closed casing 21 with inlet socket 22 and outlet socket 23, a fast-rotating separator rotor 24 is supported. The separator rotor 24 has three, four or more slightly toothed separator knives 25 running in longitudinal direction. A motor 28 directly flanged to the belt sheaves 26 and 27 drives the separator rotor 24.

The product leaves the separator 20 in an almost fluid condition whereby the size of the agglomerates is less than a few mm, on an average between approximately 0.5 and 3 mm. Since it is practically fluid, it is possible to uniformly charge the baking chamber 30. Several mixers 16 and several separators 20 are preferably connected in parallel in order to obtain higher capacities. The size of the agglomerates in determined in the separator 20 by the longitudinal slot between the knife and the casing. The agglomerates are cut to the corresponding maximum size of a few mm.

Figure 3:
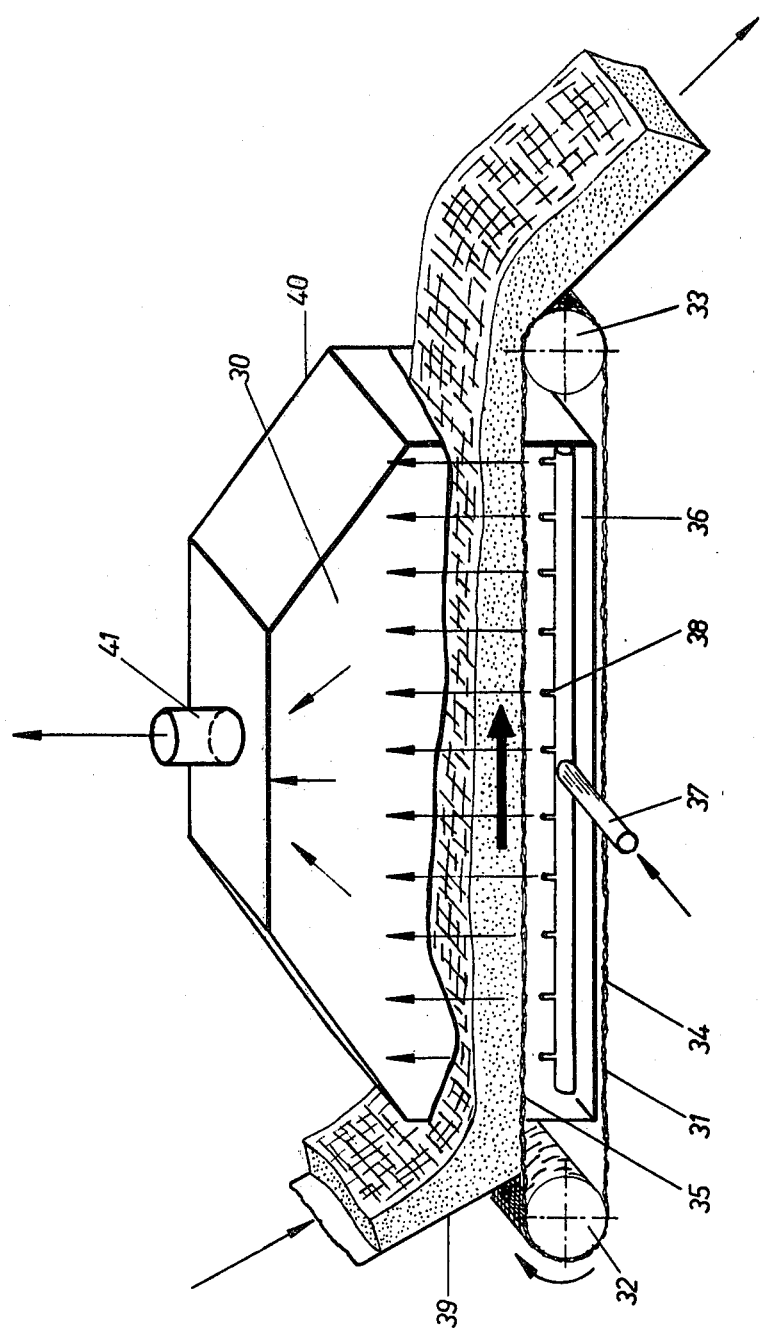
FIG. 3: a steam-heated baking chamber with a sieve-like baking belt.

The baking chamber 30 is shown in FIG. 3 on a larger scale (half view, half section). The belt 31 which consists of a wire gauze penetrable by air runs over two end rolls 32 and 33 and is driven by units which are not shown. Between the upper and lower end-piece 35 or 34, a steam injection chamber 36 almost leaning against the upper endpiece 35 is attached. A steam supply tube 37 with a large injection nozzle 38 is installed in the steam injection chamber 36 which blows the steam and possibly additional hot air or a mixture of the two directly against the upper endpiece 35. The practically fluid product is charged on the baking belt 31 over a guide duct 39. The layer is largely leveled on its own with the help of the strong flow of steam passing through the product. An air or steam collection hood 40 with a discharge socket 41 is installed above the baking belt 31. It goes without saying that the heat which is not absorbed in the baking chamber 30 can be recovered within the system. However, it is very interesting that the product does not bake together on the baking belt 31 to form a kind of strip of bread. A height of the layer of a few centimeters has, so far, proven to be a favorable layer thickness. While the product resting on the baking belt 31 is transported, it takes on a firmness similar to that of the pressed foundry molding sand.

It is a surprise that the product, as soon as it has left the baking belt 31 and is processed in a separator 50 (analogous to the separator 20), essentially breaks down again in the same agglomerates which had entered the baking chamber 30 in order to be then led to the drier in a fluid form. The product has a few percent more humidity after leaving the baking chamber 30 than when it entered the baking chamber 30 owing to the wet steam. After having left the baking chamber 30, the product has the properties of a plastic product as long as it is warm, i.e. small dough-like lumps can be formed through rolling movements with the fingers.

Figure 7:
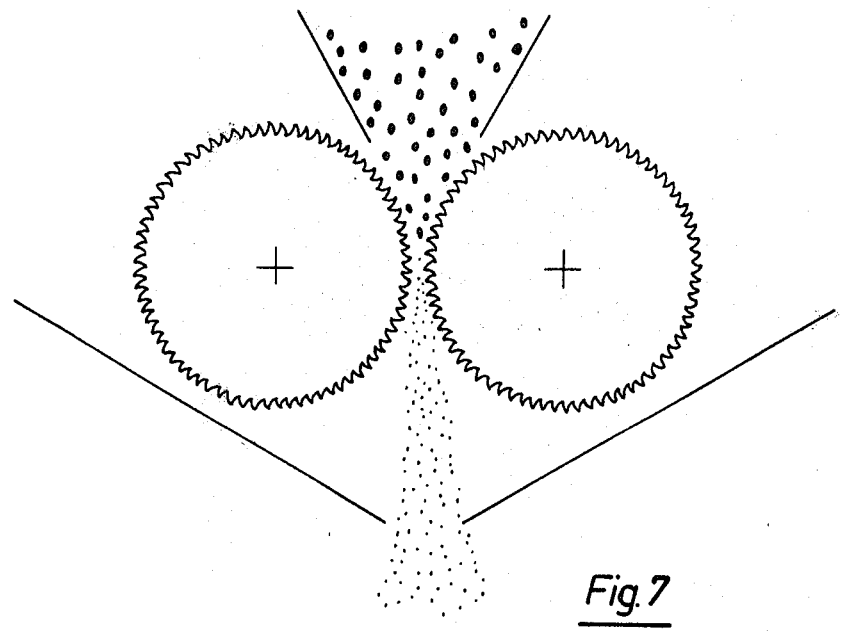
FIG. 7: a schematic representation of a roller cutting device.

The drier 51 shown in FIG. 6 is a continuous belt drier with several scaled belts 52, 53, 54, 55 and 56 all of which circulate on top of each other in a closed drying box 57. Similar driers are known in the farinaceous product industry, for example, for the production of smaller sizes. It is important that the agglomerates are charged from belt to belt during the drying process. The drying climate in the drier can be differently adjusted depending on the requirements to which the processed product is exposed. When the product reaches the end of the drier, it is slightly cooled down and led directly into a sifter 60 with several layers of sieves (cf. FIG. 10). The discharge 61 of the lower layer of sieves represents the finished bread crumbs. The siftings 62 which represent only a few percent of the total amount are too fine and are led back into the dosing unit 10 over a pneumatic conveyer system. The discharge of the first and second layer of sieves is placed on a roller frame 63 or 64, respectively. Grooved rolls which are shown stylized in FIG. 7 have proven to be best. It is not a question of an actual grinding process. The agglomerates which are too large are cut into smaller agglomerates in a kind of a cutting movement. From the roller frame, the product is again led back into the sifter.

The pallet mixer 16 is represented in FIGS. 8 and 9 at a larger scale whereby the mixing shaft 17 is driven by a motor 73 over two belt sheaves 70 or 71, respectively, and a belt 72. As can be noticed from FIG. 9, it is a question of a double shaft mixer with two mixing shafts 17 or 17', respectively, which rest in a correspondingly shaped mixer casing 74. The mixer casing 74 has a top cover 75 which can be made of transparent material in order to be able to observe the mixing process. As is, furthermore, shown in FIG. 9, the two mixing shafts 17 or 17', respectively, move in opposite directions, i.e. the mixing shaft 17' runs clockwise and the mixing shaft 17 counterclockwise whereby the product is exposed to a light pressing or kneading in the central zone. The pallets are attached to the mixing shafts 17 or 17', respectively, in different angular positions. As indicated by arrows 76, this results in a forward, backward or blocking effect for the product in the mixing trough. In the first third of the pallet mixer 16, i.e. in the zone where the material runs 77 and into which a water distribution line 78 ends, an intensive mixing of the water with the product takes place which is made possible by a corresponding inclined position of the pallets 18 in this zone. In this instance, a higher product load is advantageous to which line 79 points. After the mixing, there follows the zone of the agglomerate formation. Here, the pallets shall have a light kneading and particularly also a homogenization effect. The entire process is controlled in such a manner that the product remains in the mixing casing 74 for 2 to 20 minutes. In most cases, an optimum effect is obtained with a period of 5 to 15 minutes. The intensity of the mixing process as well as the length of the period and the degree of the charge can be controlled by selecting a special mixing shaft revolution. The revolutions of the mixing shafts are, as a rule, between 30 and 50 r.p.m. whereby, if necessary, the mixing shafts can have different revolutions. The product is finally led to the next processing stage over a free discharge 19 and the outlet 80. The totality of the influencing factors can be selected in an optimum manner by using the empirical values available in the farinaceous or bread industry. When the product leaves the pallet mixer, it should have a sphere-shaped agglomerate structure which is as uniform as possible and which, in its turn, should again be as homogenous as possible.

Figure 10:
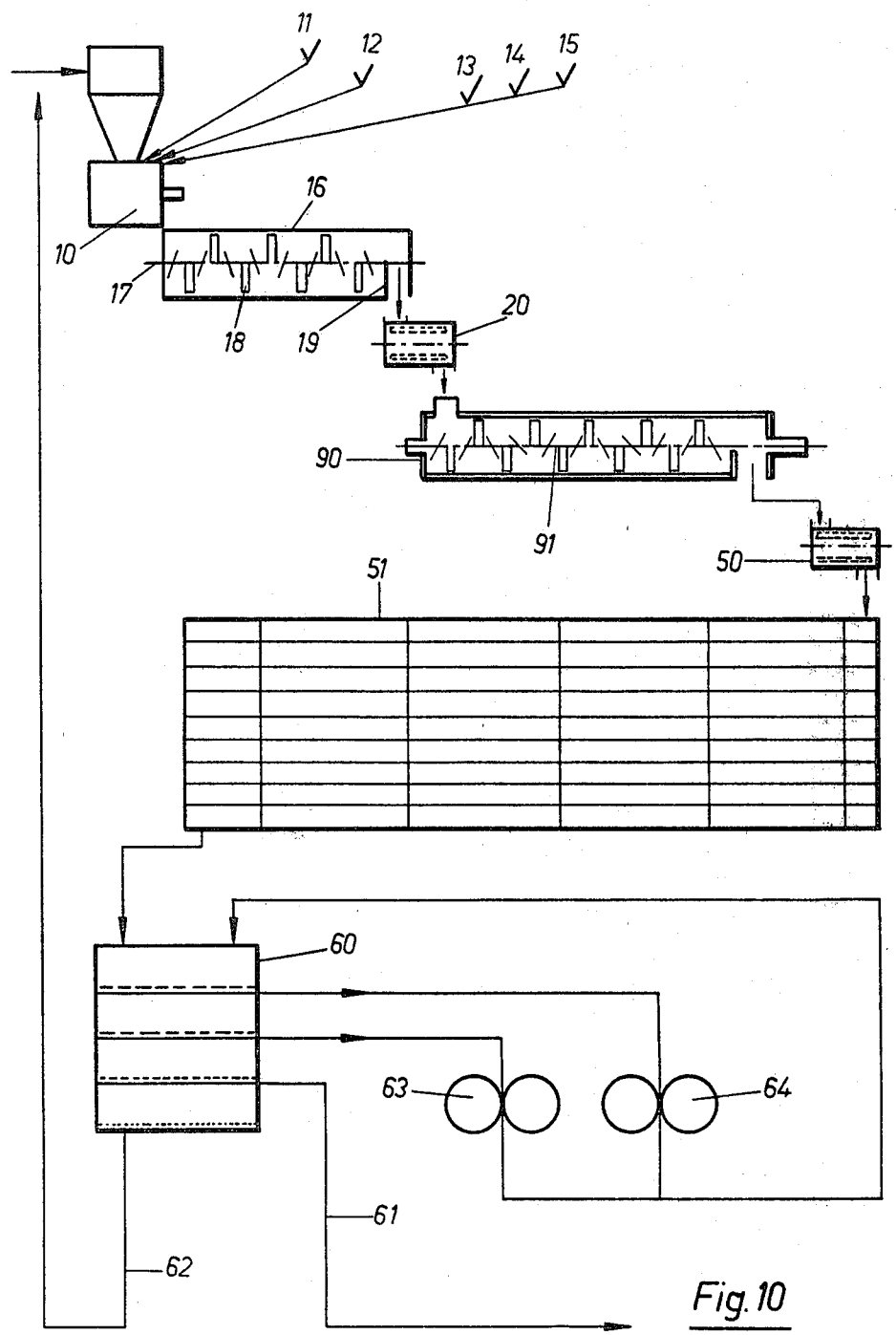
FIG. 10: a variation of the schematic representation of the arrangement according to the invention with rotary baking drum.
Figure 11:
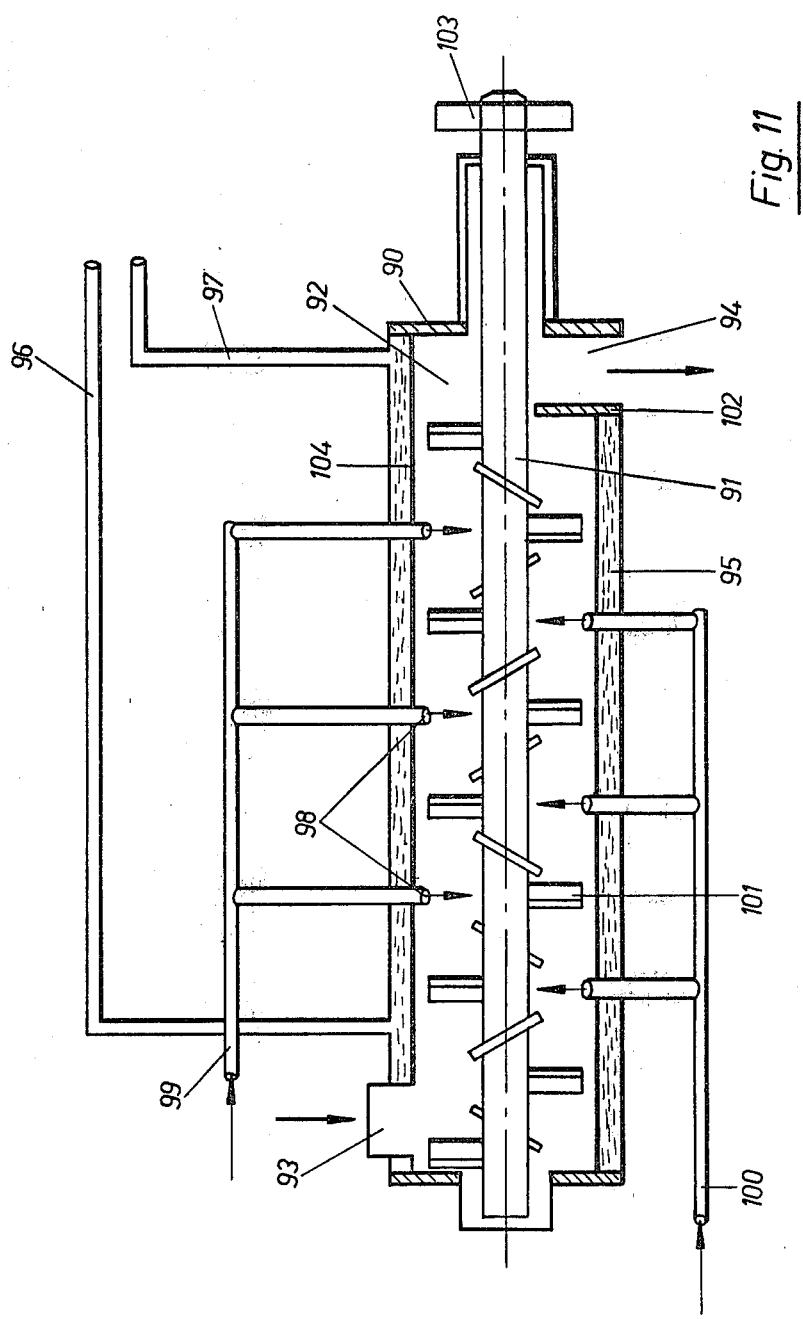
FIG. 11: a rotatory baking drum according to FIG. 10.

FIG. 10 shows a particularly advantageous baking chamber from an economical point of view which differs in its structure from the design according to FIG. 2. The baking system is represented in FIG. 10 by the baking chamber 90. A horizontal and pivoted loosening shaft 91 is in the baking chamber which has simultaneously a mixing and a conveying function. The baking chamber 90 is shown in FIG. 11 at a larger scale. The baking chamber heats an oblong cylindrical baking space 92 into which the product is introduced through an inlet 93. The product leaves the baking chamber through an outlet 94. The baking chamber 90 is insulated from the surrounding space by a double jacket 95. The double jacket can be heated to a desired temperature by means of heating agents (particularly gas and steam) whereby the heating agent is again returned to the heating system which is not shown over a line 96 and over a line 97. In practice, the double jacket 95 can once more be surrounded by an actual insulation jacket so that the heat loss is kept low. Additionally a number of steam supply nozzles 98 (for example, 10 to 20) which are connected to a steam supply line 99 or 100, respectively, lead into the baking chamber. Hot steam is directly introduced into the baking chamber 90 through the steam supply nozzles in order to obtain the necessary baking and steaming effect for the product which is to be treated.

The loosening shaft 91 has a number of pallets 101 which have multiple functions. The pallets are to transport the product from the inlet 93 to the outlet 94, they are to loosen the product but, by doing so, they are not to have, in any way, a negative influence on the agglomerate structure. The pallets 101 have, furthermore, also a mixing function. The product is subject to a light blockage in the baking chamber by means of an overfall 102. The last pallet 101 opposite the outlet 94 throws the product over the overfall 102 into the outlet 94. The loosening shaft 91 is driven by a motor which is not shown over a belt sheave to a speed of, as a rule, between 30 and 50 r.p.m. The length of the period of the product in the baking chamber 90 can be controlled and particularly the charging degree in the baking chamber 90 can be adjusted by means of the pallet position and the definite selection of the revolutions of the loosening shaft 91 as well as by the amount of the product passing through it.

During the operation, the double jacket 95 is brought to a temperature of 90° to 250° C., preferably 100° to 200° C. on the one hand, this prevents the formation of condensate on the inner wall 104 of the baking chamber 90 and, on the other hand, the heating system makes a small contribution to the baking chamber 90. However, the main portion of the thermal energy shall be given in the form of the direct steam. The indirect heat transferred through the inner wall 104 to the product constitutes, as a rule, only a portion of the total amount of heat, for example, 10 and 20%.

It is also very essential that the rotating loosening shaft 91 is installed in practical operation in such a way that it can be pulled out in longitudinal direction for cleaning purposes. The thickness of the layer of the product shall be kept, at the utmost, at about ¾ but, as a rule, at less than ½ of the diameter of the baking chamber 90. With the correct adjustment of the individual parameters, the product leaves the baking chamber 90 in a practically fluid condition.

The round baking chamber 90 shown in FIG. 11 has several advantages, particularly from a structural point of view. Thus, a compact or very small system can be built which can be easily taken care of and can be very easily cleaned in general. The round chamber can be kept very small and may, for example, only be two meters long. The inner contact surfaces of the round chamber are smooth and are necessarily always kept clean due to the whirling movement of the product.

Figure 12:
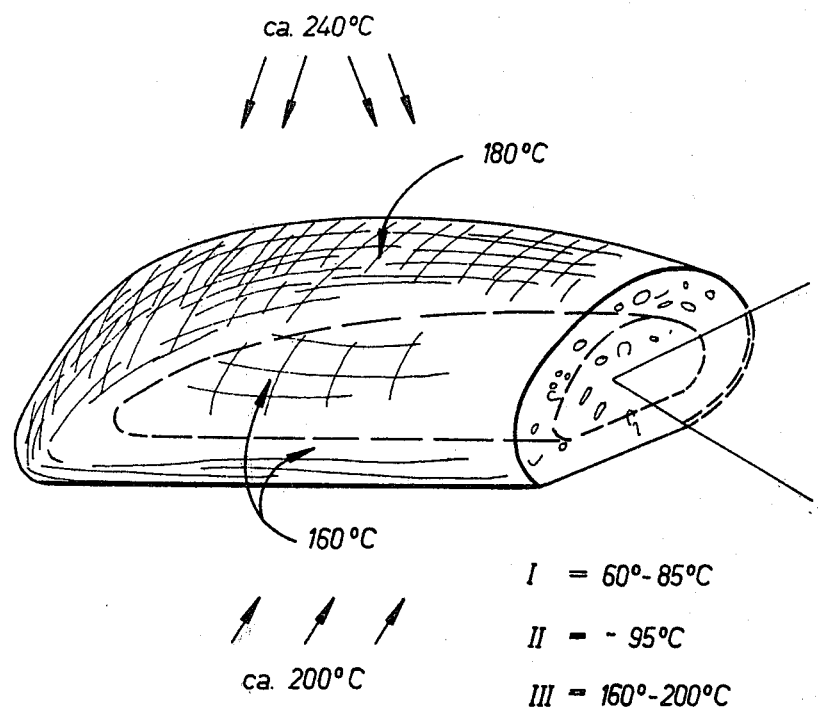
FIG. 12: the schematic representation of a loaf of bread.

FIG. 12 shows schematically the conditions which prevail in a loaf of bread during the customary bread baking process. In the given example, the bread is baked at approximately 240° C. The bread crust reaches a temperature of approximately 160° to 180° C. during the baking process. By the law of nature, only a maximum temperature of 95° to 100° C. can develop inside the bread. Towards the end of the baking period, different temperature zones can be found in the bread. Thus, the temperature in the center is at approximately 60° to 85° C. and in the adjacent layer at approximately 95° C. The actual crust of the bread takes on a temperature of 160° to 200° C. Almost all the water evaporates from the bread crust during the baking process. However, a humidity of up to 60% by weight remains inside the bread.

EXAMPLE 1

A white flour of soft wheat No. 550 was used as the raw material which had the following composition:

Initial humidity: 12.3%
Ash: 0.34% (with reference to the dry substance)
Starch: 79.1% (with reference to the dry substance)
Protein: 11.3 (with reference to the dry substance)
Fat: 0.68% (with reference to the dry substance).
500 g of this raw material were treated in a customary pallet mixer as it is, for example described in FIGS. 8 and 9 by adding water to reach a processing humidity of 39.4%. The product which was obtained in the form of agglomerates was treated in the pallet mixer for 10 minutes. Subsequently, the agglomerates were crushed to a size of less than 8 mm. Then, the thermal treatment was effected on a baking belt in the form of a wire gauze penetrable by air through which steam was led to the material to be treated. The reaction period amounted to 3 minutes and the reaction temperature to 98° C. Subsequently, this material was dried on a continuous belt drier with several scaled belts all of which circulated on top of each other in a closed drying box. During the drying process, the average temperature amounted to 80 and the $\Delta t$ 30° C. The granulation on a roller frame which was provided with grooved rolls led to a bread crumb granulate in the range from 200 to 1800$\mu$. The gelatinization degree of the finished bread crumbs amounted to 90%. The agglutination had reached an optimum degree. The swelling property amounted to 1:4.8. The bread crumbs obtained in this way had excellent properties when it was processed and showed under the microscope no intact starch grains. ($\Delta t$ 30° C. corresponds to a relative humidity of 22%).

EXAMPLE 2

Example 1 was repeated but grits of hard wheat were used. The processing humidity was adjusted at 24%. The thermal treatment during the baking process was effected for 6 minutes at a reaction temperature 90° C. The drying climate was at approximately 80° C. and $\Delta t$ at 30° C. The bread crumbs represented a granulate with a particle size of 200 to 1800$\mu$. The gelatinization degree amounted to 60%. ($\Delta t$ 30° C. corresponds to a relative humidity of 22%).

The finished product gave a loose impression in comparison with that of Example 1. Its swelling property amounted to 1:2.0. Under the microscope, starch grains could be noticed which were still intact.

EXAMPLE 3

In accordance with the process of Example 1, white flour (soft wheat) was processed in a mixture with salt, paprika, modified starch and pepper. The initial humidity amounted to 13.8% water and the processing humidity to 29.8% water. The thermal treatment during the baking process took 3 minutes and 40 seconds at a reaction temperature of 98° C. The drying climate had a temperature of 72.5° C. and the relative humidity amounted to 34% ($\sim \Delta t = 21°$ C.). After the granulation, granulates of a particle size of 200 to 1800$\mu$ were obtained. The gelatinization degree amounted to approximately 85%.

A product having a nice appearance was obtained due to the added paprika which was particularly suitable for the breading of prepared meals. The swelling property amounted to 1:3.5. No intact starch grains appeared anymore under the microscope.

EXAMPLE 4

The process of Example 1 was repeated with a hard wheat seminola having a grain size of approximately 0.3 to 0.7 mm. The initial humidity amounted to 11.4% and the processing humidity to 34% water. The initial material contained the following additional components: 0.77% ash, 75.8% starch, 11.03% protein and 1.5% fat (always with reference to the dry substance). The thermal treatment during the baking process was effected for 4 minutes at a reaction temperature of 95° C. The drying climate was at 70° C. and the relative humidity at 48% ($\sim \Delta t = 15°$ C.). After the granulation, bread crumbs of a particle size of 500 to 1500μ were obtained which had a gelatinization degree of 80%. Their swelling property amounted to 1:3. They were particularly suitable for the production of snacks. Some starch grains still appeared under the microscope but they were not agglutinated.

EXAMPLE 5

The process of Example 1 was repeated with a mixture of 50% white flour 550 and 50% Indian corn flour of the type US Yellow. The analysis of the mixture was as follows:
Humidity: 13.6%
Ash: 0.71%
Starch: 79.1%
Maltose: 1.43%
Protein: 8.3%
Fat: 1.08%
Particle size of the Granulates: <200μ
Processing humidity: 32.5%

The thermal treatment was effected at 98° C. for 4 minutes. The drying climate had a temperature of 80° C. at 21% relative humidity.

After sifting and granulating, efforts were successfully made to obtain a final product to obtain a particle size for the granulate of 200 to 600μ. The high relatinization and the good swelling property of the product made in accordance with Example 1 gave the wheat-Indian corn pap very good properties as an instant product which could be prepared cold or warm at a ratio of 1:3, i.e. one part the instant product and at least 3 parts liquid (water or milk).

What is claimed as new and intended to be covered by Letters Patent of the United States is:

1. Process for the production of bread crumbs, usuable as an instant product, which comprises providing a starch-containing raw material selected from the group consisting of flour, grits, semolina and meal, humidifying said material to a water content of 20 to 50% by weight while subjecting said material to agglomerating conditions resulting in the formation of agglomerates, baking the agglomerates in hot steam until a gelatinization degree of 50 to 100% is achieved, and drying the agglomerates whereby agglomerated bread crumbs are obtained from the dried product.

2. Process according to claim 1, wherein the raw material is humidified to a water content of 30 to 40% by weight.

3. Process according to claim 1 or 2, wherein the raw material is humidified in a continuous pallet mixer and the agglomerations which form are crushed through mechanical impact to agglomerates with a diameter of less than 20 mm.

4. Process according to claim 1 or 2, wherein the agglomerates are baked in wet steam.

5. Process according to claim 4, wherein the wet steam contains so much moisture that the moisture content of the raw material is increased by 1 to 6% by weight.

6. Process according to claim 1 or 2, wherein steam is used with an initial temperature of 90° to 200° C.

7. Process according to claim 6 wherein steam is used with an initial temperature of 90° to 130° C.

8. Process according to claim 1 or 2, wherein the agglomerates are baked for 1 to 20 minutes in the form of a loose material layer located on a sieve-like conveyor.

9. Process according to claim 8, wherein the agglomerates are baked for 2 to 6 minutes.

10. Process according to claim 1 or 2, wherein the agglomerates are baked for 1 to 20 minutes in a loose material layer in a baking chamber with rotating pallet shaft.

11. Process according to claim 1 or 2, wherein the humidifying, the baking or the drying are carried out continuously.

12. Process according to claim 1 or 2, wherein between baking and drying the agglomerates are crushed to a diameter of less than 20 mm.

13. Process according to claim 1 or 2, wherein a portion of the agglomerated bread crumbs is recovered after drying as siftings.

14. Process according to claim 13, wherein the agglomerated bread crumbs are crushed to agglomerates of the desired size by means of grinding rolls, and is sifted.

15. Process according to claim 14, wherein the agglomerated bread crumbs are crushed to agglomerates of the desired size by means of grooved rolls having a cutting effect.

16. Process according to claim 1 or 2, wherein salt, pepper, paprika, sugar and/or flavor substances are mixed with the raw materials as ingredients.

17. Process according to claim 21, wherein the ingredients and the water are added to the raw material in two separate mixing stages.

18. Bread crumbs, usable as an instant product, obtained by the process of claim 1 or 2, whereby the processed product shows a high starch hydrolyzing and a high gelatinization.

19. Process according to claim 1, wherein the agglomerated bread crumbs are crushed after drying.

* * * * *